United States Patent [19]

Lewis

[11] 3,767,916

[45] Oct. 23, 1973

[54] METHOD FOR MEASURING THE CONCENTRATION OF SAND IN A FLUID STREAM

[75] Inventor: Donald Richard Lewis, Houston, Tex.

[73] Assignee: Shell Oil Company, New York, N.Y.

[22] Filed: May 20, 1971

[21] Appl. No.: 145,490

Related U.S. Application Data

[63] Continuation-in-part of Ser. No. 13,260, Feb. 20, 1970, abandoned.

[52] U.S. Cl..... 250/83 R, 250/43.5 MR, 250/106 T
[51] Int. Cl............................................. G01t 1/16
[58] Field of Search................... 250/83 R, 43.5 FC, 250/83.3 D, 106 T

[56] References Cited
UNITED STATES PATENTS

3,348,052   10/1967   Raifsnider et al........... 250/106 T X

OTHER PUBLICATIONS

Radionuclides Measure Nose-Cone Wear in Flight, by E. R. Rathbun, from Nucleonics, Feb. 1961, pp. 100 & 101.

*Primary Examiner*—Archie R. Borchelt
*Attorney*—H. W. Coryell et al.

[57] ABSTRACT

The grain concentration of a stream of grain-containing fluid is measured by positioning an abradable radioactive material in the stream, measuring the stream velocity and the rate of abrasion-induced reduction in radiation emission, and determining the grain concentration from that of a stream of known composition that causes the measured rate of radiation emission reduction while contacting an equivalent material at the measured velocity.

5 Claims, 7 Drawing Figures

PATENTED OCT 23 1973 3,767,916

INVENTOR:
DONALD R. LEWIS
BY: *Louis J. Bovasso*
HIS ATTORNEY

METHOD FOR MEASURING THE CONCENTRATION OF SAND IN A FLUID STREAM

CROSS-REFERENCE TO OTHER APPLICATION

The present patent application is a continuation-in-part of the copending patent application, Ser. No. 13,260, filed Feb. 20, 1970, now abandoned.

BACKGROUND OF THE INVENTION

1. Field of the Invention

The invention relates to grain concentration measurements; and, more particularly, to a method for measuring the concentration of sand in fluid flowing within a well.

2. Description of the Prior Art

Recoverable fluids, such as oil, or gas and/or water, are frequently found in subterranean formations comprising unconsolidated, or loosely consolidated reservoirs. When such incompetent formations are pierced by a well bore, and the connate fluids therein removed, the loose or weakly bound sand and/or similarly-sized particles or grains are apt to become dislodged and entrained in the fluid. Also, sand control problems can be encountered in otherwise competent formations due to excessively high fluid velocities, particularly in localized areas, or because of a water invasion into a producing zone which destroys the bond between sand particles, etc. In any case, some of the dislodged sand accumulates in the well bore and other flow paths causing plugging and reduced fluid flow, while other portions of the sand is carried to the surface with the withdrawn fluid. The entrained particles cause severe erosion of underground strainers and liners, the producing string, pressure control valves, chokes, pumps and flow lines, etc. Substantial quantities of the entrained sand are deposited in field storage tanks causing cleaning and disposal problems. In extreme cases, sufficient sand can be removed from the producing formation to create large underground zones of reduced mechanical strength which can collapse the casing and cause the loss of a well. Thus, sand entrainment in fluid produced from incompetent subterranean formations can result in restricted flow, increased production and well maintenance costs, and even destruction of the well.

Both the quantity of sand carried from the producing formation and the problems associated with handling fluids containing entrained sand particles are increased by increased fluid velocity. Thus, although sand entrainment is experienced in both oil and water wells, wells producing gas or liquid-gas mixtures are particularly plagued with severe problems due to sand entrainment.

Further, sand production at the wellhead of a well borehole is often a symptom of imminent trouble in oil wells, particularly in an offshore well producing from an unconsolidated formation. The sand production is apt to be sporadic and is preferably continually monitored to be sure of detecting its appearance. To be widely useful, a method of sand detection should be reasonably inexpensive and should be able to operate in the presence of crude oil, gas, salt water, or mixtures of these three.

In a U.S. Patent to Maly, et al., Ser. No. 3,384,181, it is proposed to use the observance of the abrasion of an exposed surface as a means for measuring sand flowing into a well. However, such methods do not present quantitative measurements of the cummulative amount and current rate of the removal of the exposed surface.

SUMMARY OF THE INVENTION

It is an object of this invention to provide an improved method for measuring the concentration of sand in a fluid stream.

It is a further object of this invention to provide a method for obtaining a relatively accurate quantitative measurement of sand flowing into a well borehole.

In accordance with the present invention the concentration of grains in a stream of grain-laden fluid is measured by a combination of steps. An abradable radioactive material is positioned so that it is abraded by the stream. Measurements are made of the velocity of the stream and the rate at which the emission of radiation is reduced by the abrasion. The grain concentration of the stream is determined by determining the concentration of an equivalent stream of known composition which causes the measured rate of radiation reduction when it contacts an equivalent material at the measured stream velocity.

The present invention is at least in part, premised on a discovery that the tendency for the rate of abrasion of an abradable radioactive material to increase with increases in the concentration of grains in a grain-laden fluid having a given velocity is relatively consistent throughout the range of concentrations at which sand grains are apt to be entrained in fluids produced through wells and is relatively consistent with respect to the range of stream velocities at which such fluids are apt to flow within wells. In addition, the rates of abrasion exhibited by various concentrations of standard grains, such as grains of aluminum oxide, in streams having various velocities are substantially directly proportional to those of substantially sand-sized particles that are apt to be entrained in fluids produced from subterranean reservoirs. Because of this, if a given rate of abrasion is caused by a given concentration of the standard grains, when a correction factor is applied relative to the specific reservoir fluid and the grains it entrains from a specific subterranean reservoir is applied, the concentration of the standard grains that cause a given rate of abrasion at a given velocity substantially equals the concentration of reservoir sand grains that cause a similar rate of abrasion.

In a preferred procedure, the present invention is conducted by obtaining measurement data on the rates of reduction of radiation emission caused by abrasions of an abradable radioactive material by various concentrations of standard grains in streams having various velocities and using such data in determining the concentration of sand grains in a fluid stream that contains sand and flows within a well at a measured velocity and causes a measured reduction in the radiation emission of an abradable radioactive material in the stream. In addition, the abradable radioactive material is preferably mounted within a conduit of known diameter and known exposure to contact with a fluid stream flowing within the conduit, for example, such an abradable material may be mounted along the inner surface of a bullplug in a production conduit within a well. In such a mounting, the velocity of the stream to which the abradable material is exposed is readily determined by determining the volumetric or mass rate of fluid flow from the conduit.

DESCRIPTION OF THE PREFERRED EMBODIMENT

Figure 1:
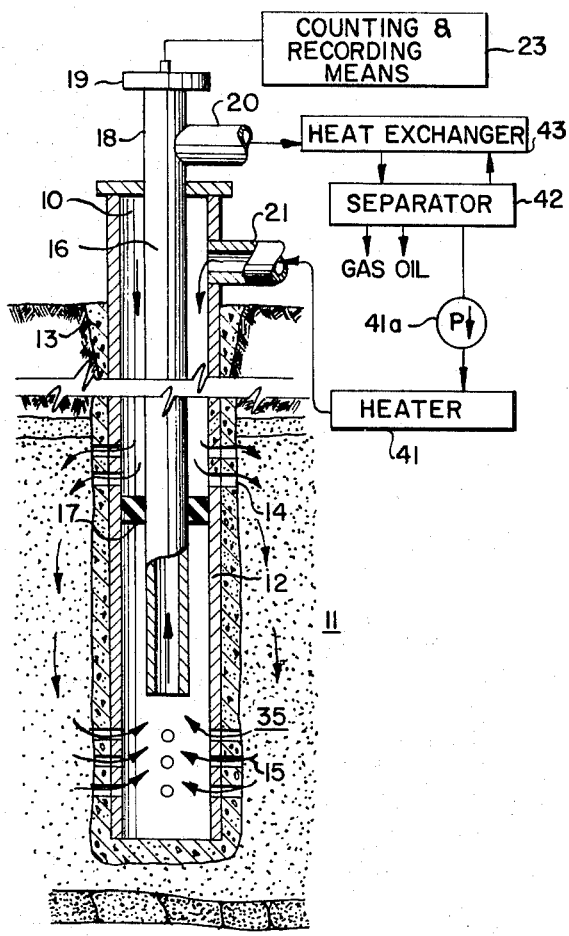
FIG. 1 is a vertical sectional view of a well borehole being treated in accordance with the techniques of my invention.

Referring to the drawing, a well borehole 10 is shown extending into a subterranean earth formation 11. Well borehole 10 may be cased, as at casing 12, with casing 12 cemented therein, as at cementing 13, as is well known in the art.

Casing 12 is perforated as at upper perforations 14 and lower perforations 15, respectively. Alternately, casing 12 may extend only to the top of formation 11, if desired. A tubing string 16 is also disposed in well borehole 10 packed off at packing means 17. Packing means 17 separates upper perforations 14 from lower perforations 15.

A T-shaped branch portion 18 is disposed at the upper end of tubing string 16. A conventional bull-plug 19 closes the run of branch portion 18. The branch 20 of branch portion 19 is coupled to a conventional heat exchanger 43, separator 42, pumping means 41a and heater 41 for circulating fluid down the annulus outlet 21 of well borehole 10, out perforations 14 and back into well borehole 10 as is well known in the art and as indicated by the arrows in FIG. 1.

It is to be understood that the formation fluids present in well borehole 10 below packing means 17 and circulating up tubing string 16 and out branch 20 include sand particles therein from formation 11. Such sand particles may in time abrade away valves, pumps, etc. Thus, it is desirable to accurately measure the abrasiveness of the abrasive fluid (i.e., the formation fluids containing the sand particles therein).

In carrying out the techniques of my invention, a radioactive detector 22 (FIG. 2) in the preferable form of a disc is mounted on bull-plug 19. Suitable radiation counting and recording means 23 are coupled to detector 22. Preferably, detector 22 is a radiation device which is coated on its exterior surface with a radioactive coating. As the amount of the radioactive coating 24 is reduced by the abrasion of the coating 24 by the sand particles in the flowing formation fluid, the count rate from the detector 22 (FIG. 1) decreases, such decreases being directly proportional to the extent of the abrasion. The amount of abrasion for constant fluid flow conditions varies with the amount of sand particles in the flowing formation fluid stream and permits an estimate of the sand particles content therein. Detector 22 is preferably an integrating detector so that the abrasion effect is cummulative and the count rate need be sampled only at intervals rather than monitored continuously to determine the concentration of sand particles in the flowing formation fluid. If the detector 22 is monitored continuosly, however, the average rate continuously, decrease in its count rate may be related to the average concentration of sand particles in the flowing formation fluid.

Measurements are made of the velocity of the stream of sand-containing fluid that contacts the abradable radioactive material 24. Where (as shown) the abradable material is mounted within a conduit of known diameter, the velocity of the fluid stream that contacts it can be determined from the instantaneous and/or average volumetric or mass rate of fluid flow through a conduit, such as conduit 20. Such flow measurements usually are made on substantially all producing wells, by means of techniques and equipment (not shown) known to those skilled in the art. Alternatively, or additionally, such flow measurements can be made by installing a measuring device within the conduit in which the abradable material is mounted or within a conduit having a known fluid flow relationship with that conduit.

Detector 22 may include, but is not limited to, a Geiger-Mueller tube, a solid-state barrier-layer detector, a scintillometer or any other type of radiation detector appropriate to respond to the radioisotopes used on the exterior coating 24 of the detector 22. The sensitivity of the detector 22 to the abrasive material in the flowing fluid may be varied by incorporating radioisotopes in coating materials of different responses to abrasion. For example, metal films with different hardness, plastic coatings, or combinations may be used to give sensitivity to low particle contents and continuing response at high particle content.

The total amount of radioactive isotope used in coating 24 is determined by the maximum counting rate capability of the radiation detector 22. The counter portion of detector 22 preferably counts initially at as high a rate as possible without excessive loss of counting efficiency or coincidence losses. As abrasion of coating 24 occurs, the reduction in count rate is then directly proportional to the loss of material from coating 24.

Figure 3:
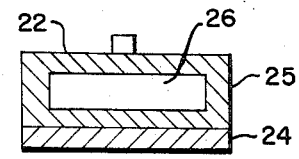
FIGS. 3 and 4 are side views of modifications of the detector of FIG. 2.

Preferably, the coating 24 to be abraded is placed on an external sleeve 25 (FIG. 3) which fits over the body 26 of the detector 22 thus permitting easy and economical replacement.

Figure 4:
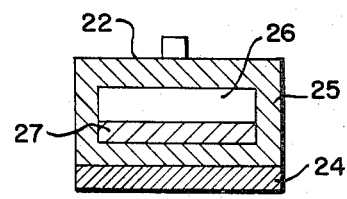

In certain applications, deposits of the elements of the flowing abrasive fluid may be formed on coating 24. To prevent such accumulation, a conventional thin layer electric heater 27 may be placed between detector body 26 and the external sleeve 25 for heating the surface of detector 22 as shown in FIG. 4.

Figure 2:
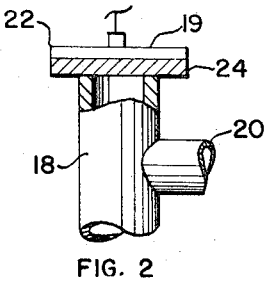
FIG. 2 is a detailed view of a portion of the well borehole of FIG. 1 containing a sand detector.
Figure 5:
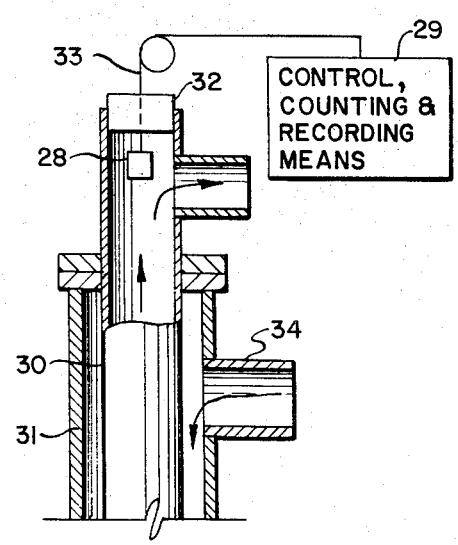
FIG. 5 is a vertical sectional view of an alternate method of treating the well borehole of FIG. 1.

In the foregoing embodiments, the thickness of the layer of coating 24 may be varied to provide an extended range of sand particle detection. Further, the exact configuration of the detector 22 is a matter of choice. It may take a variety of configurations with the coating 24 on either both sides of detector 22 or only the side of the detector in contact with the flowing fluids. Alternatively, the detector 22 need not be a bull-plug 19 closing the run of a T-shaped branch portion 18 as illustrated in FIG. 1. For example, as illustrated in FIG. 5, the detector may be a cylindrical detector 28 coupled to suitable means 29 for counting and recording the radiation from detector 28 and controlling the extent of detector 28 into a tubing string 30 disposed in well borehole 31. A conventional liquid seal 32 closes the top of tubing string 30 with the cable 33 coupled to detector 28 extending therethrough as is well known in the art. In this manner, fluids may be circulated down annulus outlet 34 and removed up tubing string 30 as discussed hereinabove with respect to FIG. 1. The fluid circulating means and various apparatus of well borehole 31 have been eliminated for convenience of illustration.

Figure 6:
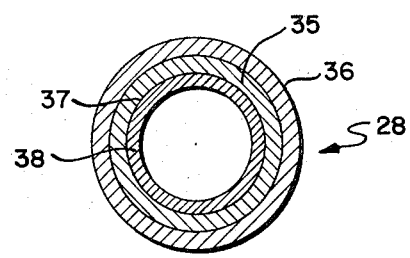
FIG. 6 is an end view of a further modification of the detector of FIG. 2.
Figure 7:
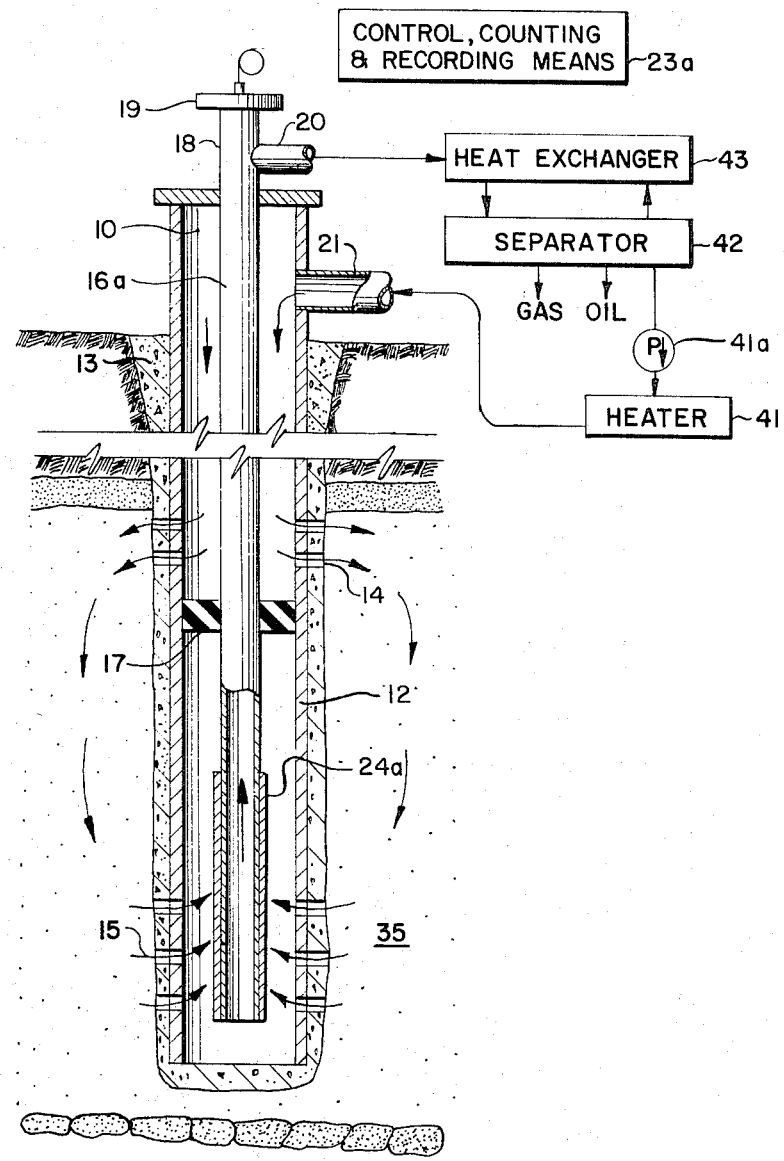
FIG. 7 is a vertical sectional view of still another method of treating the well borehole FIG. 1.

As illustrated in FIG. 6, detector 28 may include an external sleeve 35 having an outer coating 36 similar to coating 24 of FIG. 1. A thin layer heater 37, similar to heater 27 of FIG. 4, may be disposed between the body 38 of detector 28 and sleeve 35.

In all of the above embodiments, the abradable coatings may be on one side of the detector only. In such embodiments, particularly the embodiment of FIG. 1, only the side facing upstream of the flowing fluid is coated. Such coating gives the maximum range of counting rates from the initial to the final useful operating condition of the detector. The shape of the detector and its orientation in the flowing fluid stream is selected to give the most useful rates of abrasion for the particular set of fluid flow conditions involved.

Alternatively, as shown in FIG. 6 wherein like numerals refer to like parts of FIG. 1, tubing string 16a extends to a position opposite at least some of perforations 15 from which fluids are being produced. Instead of a coating 24 being mounted on bull-plug 19 as in the embodiment of FIG. 1, coating 24a, similar to coating 24 of FIG. 1, is disposed on the external surface of tubing string 16a at least at the lower end thereof (e.g., adjacent some of perforations 15). In this manner, coating 24a is in contact with the produced fluids. Further, as an added feature of this embodiment, the location of the perforations that are producing sand (i.e., perforations 15) may be determined by moving the detector 28 of FIG. 5, coupled to control and recording means 23a, similar to control and recording means 29 of FIG. 4, within tubing string 16a. Further explanation is deemed unnecessary since the previous description of FIGS. 1 through 5 is also applicable to FIG. 6.

The actual amount of radioactive isotope present in the coatings is preferably very small. For example, a few microcuries (each of which provide $3.7 \times 10^4$ disintegrations/second) of a radioisotope gives initial count rates of approximately one million counts per minute. Although radioisotopes emiting any kind of radiation may be used in principle, gamma emitters are preferably used because of the energy required to penetrate the sensitive volume of the detector. The half-life of the radioisotope is preferably long compared to the observation period of the detector so that no significant decrease in count rate occurs due to natural radioactive decay. In one application of the teachings of my invention, a base disc of nickel-plated steel having one surface of one microcurie of Cobalt-60 coplated with nickel has been used to form the abradable coating.

The techniques of my invention as disclosed hereinabove may be used at readily accessible or remote surface locations, as shown in FIG. 1, or as shown in FIG. 5, at a downhole location within a well borehole. At accessible locations, portable detectors may be used to measure, for example, the rate in units such as milliroentgens per hour at which the radioactive energy is received by the detector. At remote locations, the detector may be combined with means for telemetering a signal proportional to the measurements to a convenient location.

In all of the foregoing embodiments, the shape of the detector and the composition and placement of the coating may be varied in accordance with the specific use desired.

In various situations, the time at which sand begins to appear in fluids produced through a well is important, for example, after the well has been treated to prevent sand inflow. In such a situation, the well conduits can advantageously be arranged for an insertion of an abradable radioactive material such as coating 24 on an easily accessible element as bull-plug 19 and equipped with a qualitative detector of the presence of entrained sand in fluids flowing through the well. Such a qualitative detector can advantageously comprise a spring-biased electrically conductive member that is kept from closing a circuit (for electrically marking a record, flashing a light, or providing a similar indication) by an abradable material is mounted in the flow path of fluid flowing through a well conduit such as conduit 20. Alternatively, such a qualitative detector can comprise a pressure responsive switch means mounted in a chamber in which the pressure is different from the ambient pressure within a surrounding conduit (such as conduit 20) with the chamber having at least one abradable portion of wall so that a pressure change due to an erosion of the wall causes the switch means to respond to produce an indication, etc. Such a qualitative detection can advantageously be utilized by positioning an abradable radioactive material and associated means for detecting an erosion of it in the path of fluid that flows within a well and deferring the measuring of the concentration of grains in fluid flowing within the well until the appearance of such grains is indicated by the actuation of the qualitative detector.

What is claimed is:

1. A process for measuring the concentration of grains in a grain-containing stream of fluid, comprising:
   positioning an abradable radioactive material so that it is abraded by the fluid stream;
   measuring the velocity of the fluid stream;
   measuring the rate at which the emission of radiation is diminished by the abrasion of the radioactive material; and
   determining the grain concentration of the stream by determining the grain concentration of an equivalent stream of known composition which causes the measured reduction of radiation emission when it contacts an equivalent material at the measured stream velocity.

2. The process of claim 1 in which said abradable material is positioned within a surface-located portion of a wellhead conduit.

3. The process of claim 2 in which said stream velocity is measured by measuring a rate of fluid flow through said wellhead and determining the corresponding velocity in the vicinity of the abradable radioactive material.

4. The process of claim 3 in which said grain concentraction is determined by contacting abradable radioactive material with a series of standard streams of grain containing fluid of known composition at a series of velocities and detecting the grain concentration of the standard stream that provides the measured rate of radiation emission reduction when it contacts said abradable radioactive material at the measured stream velocity.

5. The process of claim 1 in which:
   a first abradable material associated with means for indicating the occurence of its abrasion to a selected extent is positioned in contact with a stream of fluid that flows within the well; and
   said measuring of the stream velocity, radiation emission reduction and grain concentration is deferred until the production of an indication of the abrasion of the first abradable material has occurred.

* * * * *